(12) United States Patent
Brodie

(10) Patent No.: US 8,029,042 B1
(45) Date of Patent: Oct. 4, 2011

(54) HILTON AIR SCOOP

(76) Inventor: Hilton J. Brodie, Edmonds, WA (US)

( * ) Notice: Subject to any disclaimer, the term of this patent is extended or adjusted under 35 U.S.C. 154(b) by 1014 days.

(21) Appl. No.: 12/798,174

(22) Filed: May 22, 2007

(51) Int. Cl.
*B62D 35/00* (2006.01)

(52) U.S. Cl. ................... 296/180.2; 296/180.1

(58) Field of Classification Search ......... 296/180.1, 296/180.2, 180.3, 180.4, 180.5, 181.5; 180/903; 244/130, 159.3
See application file for complete search history.

(56) References Cited

U.S. PATENT DOCUMENTS

| | | | |
|---|---|---|---|
| RE28,652 E * | 12/1975 | Bildfell | 296/180.2 |
| 4,867,397 A * | 9/1989 | Pamadi et al. | 296/180.1 |
| 6,290,174 B1 * | 9/2001 | Gioia | 244/105 |
| 7,059,662 B1 * | 6/2006 | Drews | 296/180.1 |
| 7,192,077 B1 | 3/2007 | Hilleman | |
| 7,226,117 B2 * | 6/2007 | Preiss | 296/180.1 |

* cited by examiner

*Primary Examiner* — Lori Lyjak
(74) *Attorney, Agent, or Firm* — Janeway Patent Law PLLC

(57) ABSTRACT

This air scoop is a revolutionary idea, which allows a portion of drag wind to be used to push an automobile, or to lighten an aircraft. There are no working parts, just the box. This is made possible, by using a car-top box with a wind entrance that narrows down, increasing the wind's velocity as it passes through, then turns approximately 90° at the point of exit, to either push an automobile, or lift an aircraft. The result for either an automobile, or an aircraft is that, as speed in miles per hour increases, the miles per gallon of fuel used decreases asymptotically. In the case of private or commercial aircraft, they can either fly faster, or use less fuel for a given distance flown. In the case of very high-speed military aircraft, they can both fly faster, and stay in the air longer between fueling stops.

8 Claims, 4 Drawing Sheets

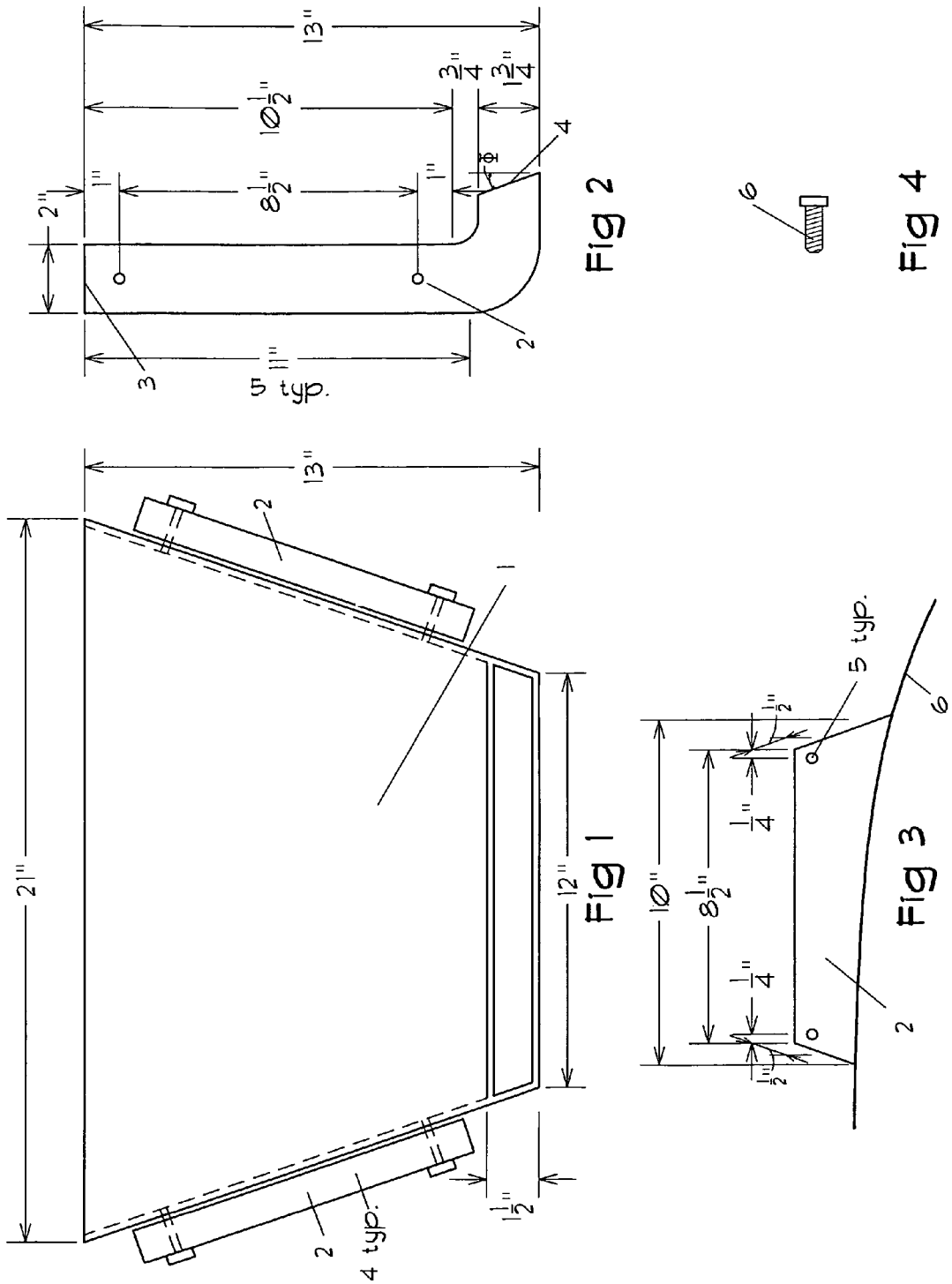

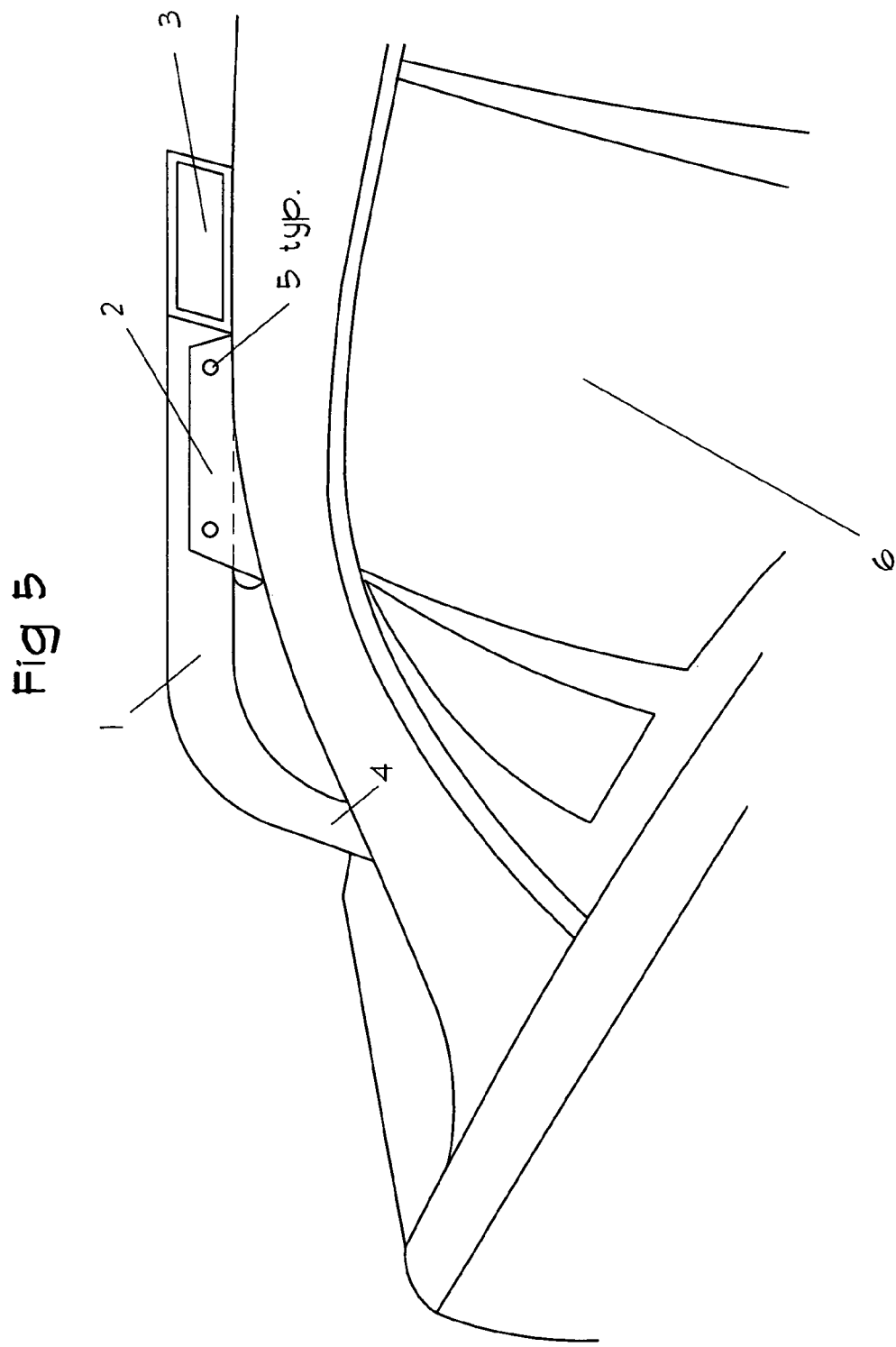

HILTON AIR SCOOP

SUMMARY

This is a submission for a non-provisional Utility Patent for a real, useful, and valuable inventive idea, and therefore does not violate the laws of nature, physical phenomenon, or simply be an abstract idea.

This invention is similar to that of Wind Generators, in that is makes use of the power of the wind passing through an air scoop, to take advantage of the speed of a vehicle to push it, or to lift and lighten an aircraft.

As wind enters the air scoop, it is forced through a narrowing box, to increase its exit velocity, then changes direction of the wind, at the point of exit.

BRIEF DESCRIPTION OF THE FIGURES

FIG. 1 shows a top view of the Air Scoop 1 upside down 1, including Air Scoop Holders 2, Air Entrance 3, Air Exit 4, Mounting Holes 5 and Mounting Bolts 6.

FIG. 2 shows a side view of the Air Scoop 1, showing Mounting Holes 5, Angle Φ of the rear window, Air Entrance 3 and Air Exit 4.

FIG. 3 shows a side view of Air Scoop 1 Holders 2, with Mounting Holes 5. Thickness of material at discretion of manufacturer.

FIG. 4 shows a Typical Mounting Bolt 6.

FIG. 5 shows a view of the Air Scoop 1, mounted on a Car, with Air Scoop Holders 2, Air Entrance 3 and Air Exit 4.

DETAILED DESCRIPTION

Figure 6:
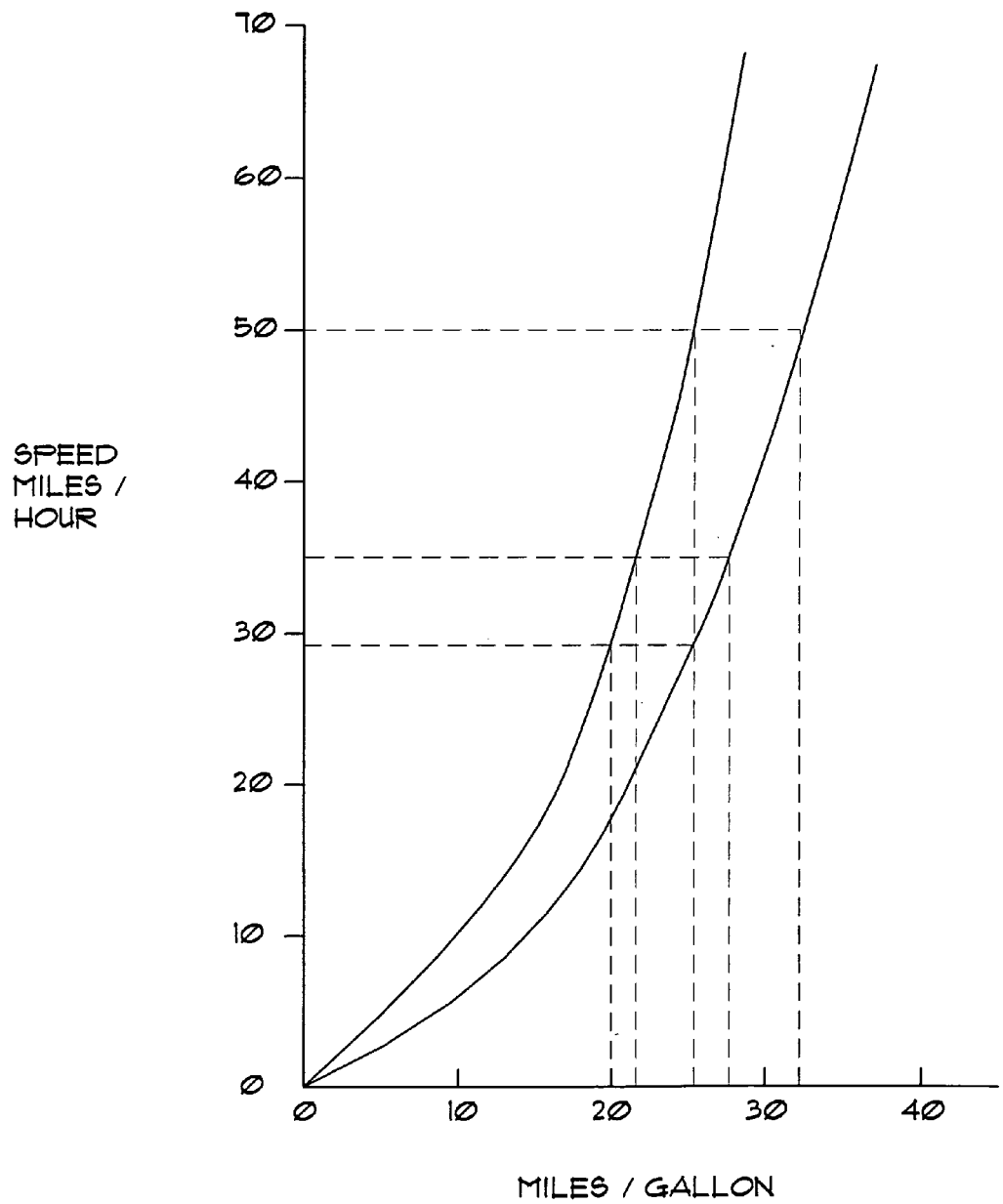
FIG. 6 shows a graph: SPEED MILES PER HOUR VS MILES/GALLON
Figure 7:
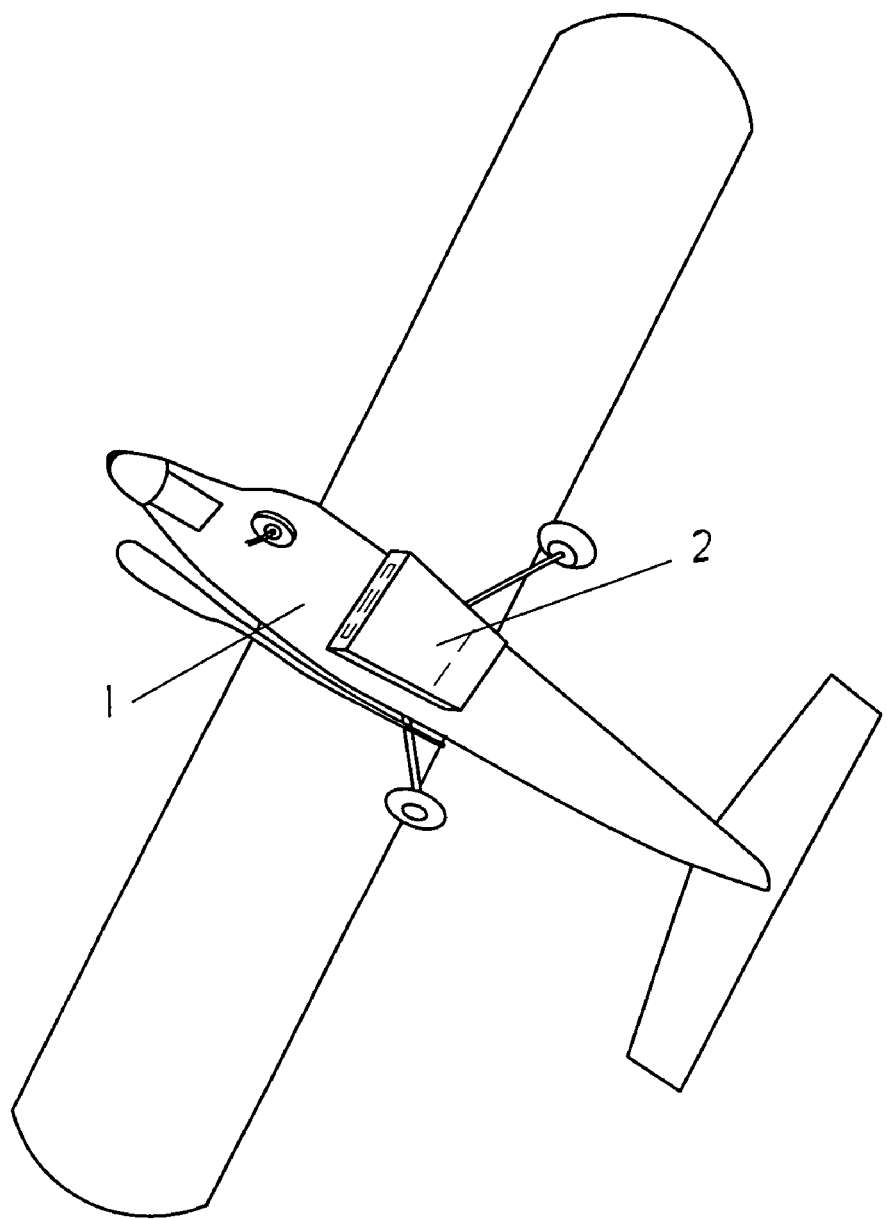
FIG. 7 shows a bottom view of Airplane, showing direct-mounted Air Scoop 2.

My invention is similar to a wind generator whose power comes from the natural wind as it strikes vanes or blades. My Air Scoop creates power from the wind entering it whenever a vehicle or aircraft is underway, and uses that power to push a vehicle or lighten an aircraft. In both cases, the greater the wind power, the greater is the fuel efficiency.

Inasmuch as the air scoop is in effect just an open box, it has no working parts, and can be made of any solid material, and in any length, weight, or area of entrance or exit. The exterior dimensions of my trial scoop for my Buick are: 15"×3-1.2"×2'-4" straight, and 1;3: on a 90 degree curve. The interior dimensions are: 13½"×3⅜", with the exit made narrower down to 2¹⁄₁₆" to give more velocity to the push. The exterior dimensions of my trial scoop for the trainer airplane are: 5½:×2½×⅔" long, and an additional length of 1¾: on a 90 degree curve. The interior dimensions are: ⅜:×2⅜, with the exit narrowed down to ³⁄₁₆".

The air scoop, in capturing the oncoming high-speed wind, gives either of the following results:

1. By placing the Air Scoop entrance at the top rear of an automobile, and its narrower exit end at the top of the rear window, the wind give the automobile an additional push, much as a tail wind does for an airplane.
2. By using the air scoop entrance underneath the front part of the Airplane, and its narrower exit end pointing up against the fuselage at the airplane's center of gravity, the wind effectively picks up the aircraft, reduces it's weight, and gives it either greater acceleration or savings in fuel per mile flown.

The reason the overall effect of using the Air Scoop is positive, is that the box acts much like a balloon, which when full, expands in all directions. Therefore the wind pressure in the box pushes out on all four sides of the box, diminishing the drag from the wind exit by approximately three to one.

This results in a considerable saving of fuel, for both a vehicle and an aircraft. In the case of the aircraft, longer flights can be taken with the same amount of fuel.

To experiment with my idea, I used a toy balsawood car constructed an air scoop, that turned the wind 180 degrees. Without the Air Scoop, I timed a distance of 15-feet in 3.0 seconds. I repeated the test using my Air scoop and recorded the time as only 2.8 seconds, for a gain of speed of 3.0/2.8=1.07-7%. see page 7.

With this result, I realized that as long as a vehicle or aircraft, is in motion, some of the wind's speed, force, and energy, would always be available to do work.

I then constructed an Air Scoop for my Buick automobile, and tested it on local streets. see pages 7 and 8. Without the Air Scoop I drove a distance of 29.7 miles at 29.7 miles per hour, making 20.0 miles per gallon. With my Air Scoop, I repeated the test, making 25.2 miles per gallon, for a gain of 5.2 miles per gallon. For example, I drove my Buick on local streets, a distance of 29.0 miles using 1.438 gallons of gas. I then drove the same trip, with my Air Scoop on, and used only 1.231 gallons of gas.

Calculation

Without Air Scoop:
Total trip miles 29.0 miles/1.438 gallons used=20.2 miles/gallon
With Air Scoop:
Total trip 29.0 miles/1.231 gallons used=23.6 miles/gallon. 23.6−20.2=3.4 gallons saves per mile, using my Air Scoop I then made similar tests on the freeway where I drove 93.5 miles at 35.0 miles per hour. Without my Air Scoop I made 21.5 miles per gallon. With my Air Scoop I made 27.5 miles per gallon, for a gain of 6.0 miles per gallon.

For my second freeway test, drove 93.5 miles, at 50.0 miles per hour. Without my Air Scoop I made 24.5 Miles per gallon. With my Air Scoop I made 32.1 miles per gallon, for a gain of 7.6 miles per gallon. For example, I drove my Buick a distance of 94.0 miles on a freeway, using 3.444 gallons of gas. I then drove the same distance, using only 27.3 gallons of gas.

Calculation

Without Air Scoop:
Total trip 94.0 miles/3.444 gallon used=27.3 miles/gallon
With Air Scoop:
Total trip miles 94.0/2.75 gallons used=34.2 miles/gallon. 3.44−2.75=1.25 gallons saved per mile, using my Air Scoop.

The above results show that as a vehicle, or aircraft speeds up, the savings in fuel increases exponentially when my Air Scoop is used. And, it also shows that when high-speed commercial and military aircraft are fitted with my Air Scoop, tremendous savings of fuel will result per flight, together with a considerable reduction of air pollution.

FIG. 6, see Page 9, shows Speed Miles/Hours Vs Miles/Gallon, and shows the normal fuel mileage for my automobile, related to the gain I get in miles per gallon, using my Air Scoop. It also shows that the faster a vehicle goes, the greater the gain in fuel consumption. A similar graph for the radio controlled airplane, shows a similar fuel gain, and shows that a plane can fly longer with its fuel capacity.

Also, as a member of the Snohomish Radio Aero Club, an association of radio-controlled Model Airplanes, one of the club members, a former U.S. Army Pilot, flew his Kadet Mark 1 trainer plane for my fourth test, with the air scoop underneath the plane, and its exit at the point of the plane's pressure. This test showed that, without the Air Scoop the plane flew a distance of 297 feet from takeoff in 7.0 seconds, and with the Air Scoop the in 6.7 seconds. The results of the test showed a gain in speed of 4.5%. The pilot reported hat he found no difference in handling of the airplane, with the Air Scoop attached.

More specific details of the model airplane test follows. Field length from 3-feet inside 300 foot air strip=297 feet. Fly 3-4 feet above the landing strip at full throttle.

Trip Without Air Scoop:
Time of Flight=7.0 seconds
297 feet/7.0 seconds=42.4 feet/second
Trip With Air Scoop:
Time of Flight 6.7 seconds
297 feet/6.7 seconds=44.0 feet/second
Time Without Air Scoop (7.0 seconds) divided by Time With Air Scoop (6.7 seconds)=1.045=4.5% gain in speed, or 44.0−42.4=a gain of 1.6 feet/second.

I claim:

1. A system comprising:
   a vessel for transportation; and
   a scoop that includes:
      an entrance having an area, and
      an exit having an area that is smaller than the entrance's area,
   the scoop being fastened to the vessel such that as the vessel moves, air enters the scoop through the entrance, flows through the scoop, and then leaves the scoop through the exit to contact a trailing surface of the vessel.
2. The system of claim 1 wherein the vessel includes an automobile.
3. The system of claim 2 wherein the trailing surface of the automobile includes a rear window.
4. The system of claim 1 wherein the vessel includes an airplane.
5. The system of claim 4 wherein the trailing surface of the airplane includes a bottom of the airplane's fuselage.
6. The system of claim 1 wherein the air leaving through the exit travels in a direction 90 degrees relative to the direction of the air traveling through the entrance.
7. A method for propelling an automobile, the method comprising:
   entering air into a scoop fastened to the automobile, the air entering through an entrance of the scoop, the entrance having an area;
   moving the air through the scoop without combusting the air;
   directing the air toward a rear portion of the automobile;
   expelling the air from the scoop through an exit of the scoop such that the air contacts the rear portion of the automobile, the exit having an area that is smaller than the entrance's area so that the speed of the air leaving the exit is greater than the speed of the air entering the entrance.
8. A method for lifting an airplane, the method comprising:
   entering air into a scoop fastened to the airplane, the air entering through an entrance of the scoop, the entrance having an area;
   moving the air through the scoop without combusting the air;
   directing the air toward a bottom portion of the airplane;
   expelling the air from the scoop through an exit of the scoop such that the air contacts the rear portion of the automobile, the exit having an area that is smaller than the entrance's area so that the speed of the air leaving the exit is greater than the speed of the air entering the entrance.

\* \* \* \* \*